United States Patent [19]

Tatsumi

[11] Patent Number: 5,745,262
[45] Date of Patent: Apr. 28, 1998

[54] IMAGE READ-OUT AND PROCESSING APPARATUS HAVING A PARAMETER CORRECTION CIRCUIT

[75] Inventor: Setsuji Tatsumi, Kanagawa-ken, Japan

[73] Assignee: Fuji Photo Film Co., Ltd., Kanagawa-ken, Japan

[21] Appl. No.: 720,976

[22] Filed: Oct. 16, 1996

[30] Foreign Application Priority Data

Oct. 16, 1995 [JP] Japan ..................... 7-266816

[51] Int. Cl.$^6$ .................. H04N 1/46; G03F 3/08
[52] U.S. Cl. ............ 358/504; 358/518; 358/523; 358/524; 358/506; 358/406; 358/446; 358/466; 358/487; 358/475; 348/96; 348/362; 348/364; 382/270; 382/272; 382/274
[58] Field of Search .................... 358/504, 518, 358/519, 523, 525, 406, 468, 524, 522, 520, 516, 509, 475, 487, 506, 446, 448, 501, 401, 465, 466, 461; 348/97, 362, 363, 364, 95, 96; 382/274, 270, 272

[56] References Cited

U.S. PATENT DOCUMENTS

| | | | |
|---|---|---|---|
| 5,162,899 | 11/1992 | Naka et al. | 358/518 |
| 5,164,837 | 11/1992 | Hirosawa | 358/518 |
| 5,210,600 | 5/1993 | Hirata | 358/406 |
| 5,475,509 | 12/1995 | Okamoto | 358/518 |
| 5,486,861 | 1/1996 | Miyamoto | 348/362 |

*Primary Examiner*—Edward L. Coles, Sr.
*Assistant Examiner*—Fan Lee

[57] ABSTRACT

An image read-out and processing apparatus comprises an image read-out section, which carries out a preliminary readout and a final readout, and an image processing section. In the final readout, the amount of light irradiated to an image storage sheet, on which an image has been recorded, and/or the light accumulation time of a photoelectric conversion device is adjusted appropriately in accordance with preliminary read-out image information obtained from the preliminary readout. The image processing section is provided with a color and density correcting device for correcting the final read-out image information such that the color and the density of the image may become appropriate, and for determining the degree of correction, which is carried out on the final read-out image information, in accordance with a parameter, which is set in accordance with the preliminary read-out image information. A parameter correcting device corrects the parameter in accordance with the final read-out image information.

25 Claims, 2 Drawing Sheets

IMAGE READ-OUT AND PROCESSING APPARATUS HAVING A PARAMETER CORRECTION CIRCUIT

BACKGROUND OF THE INVENTION

1. Field of the Invention

This invention relates to an image read-out and processing apparatus. This invention particularly relates to an image read-out and processing apparatus, wherein an image signal is detected from an image storage sheet on which an image has been recorded, such as a transmission type of image storage sheet, e.g. photographic film (negative film or reversal film), or a reflection type of image storage sheet, e.g. photographic paper carrying a photographic print, the image signal representing the image is then subjected to a process for correcting color and density, and a processed image signal is thereby obtained.

2. Description of the Prior Art

Recently, research of digital photo printers has been carried out. With the digital photo printers, light having been produced by a light source is irradiated to an image storage sheet on which an image has been recorded, such as a transmission type of image storage sheet, e.g. photographic film (negative film or reversal film), or a reflection type of image storage sheet, e.g. photographic paper carrying a photographic print. Light carrying the image information representing the image, which light has passed through the image storage sheet or has been reflected by the image storage sheet, is detected by a photoelectric conversion means, such as a charge coupled device (CCD) image sensor, and the image information is thereby detected. Thereafter, a light beam, such as a semiconductor laser beam, is modulated in accordance with the obtained image information, and a photosensitive recording material, such as photographic paper, is scanned with and exposed to the modulated light beam. In this manner, a visible image is reproduced on the recording material.

The digital photo printer is provided with an image read-out section for reading out the image, a printing section for exposing the photosensitive material to light, and an image processing section for carrying out predetermined signal processing on the image information, which has been detected in the image read-out section, such that an image having appropriate color and density may be reproduced in the printing section.

The image read-out section of the digital photo printer may be provided as an independent image read-out apparatus located separately from the main body of the digital photo printer and will hereinbelow be referred to also as the image read-out apparatus. In the image read-out apparatus, during the operation for reading out (detecting) the image, a preliminary read-out operation (hereinbelow referred to as the preliminary readout) is carried out in order to approximately ascertain the image information having been recorded on the image storage sheet. In the preliminary readout, such that the image may be read out under read-out conditions appropriate for, for example, the performance of the photoelectric conversion means, which may be constituted of the CCD image sensor, or the like, such as the dynamic range, the linearity, and the resolution, the amount of light irradiated to the image storage sheet and the light accumulation time of the photoelectric conversion means are set appropriately, and the image is read out from the image storage sheet under the thus set read-out conditions. Thereafter, the read-out conditions for the final readout are set appropriately for each image in accordance with the preliminary read-out image information, which has been obtained from the preliminary readout.

Specifically, in the preliminary readout, the amount of light irradiated to the image storage sheet and the dynamic range of the photoelectric conversion means are set with reference to an ordinary image such that, for any of images having various different distributions of image density, each image can be read out approximately over the entire range of the image density distribution. On the other hand, in the final readout, the amount of light irradiated to the image storage sheet is adjusted in accordance with the preliminary read-out image information, such as the image density distribution, which has been obtained from the preliminary readout, and the dynamic range of the photoelectric conversion means is adjusted such that it may approximately coincide with the image density distribution.

In cases where the preliminary readout for approximately ascertaining the image information is carried out before the final readout is carried out, the read-out conditions for the final readout can be narrowed within a certain range. Therefore, the technique for utilizing the preliminary read-out is very efficient for carrying out an appropriate readout for each image.

The image processing section of the digital photo printer may be provided as an independent image processing apparatus located separately from the main body of the digital photo printer and will hereinbelow be referred to also as the image processing apparatus. The image processing apparatus carries out processing for correcting the color, density, and the like, on the final read-out image information, which has been obtained from the final readout, such that an image having appropriate color, density, and the like, may be reproduced. For example, a color and density correcting means is provided in the image processing apparatus and sets the degree of correction of the color and the density in accordance with a parameter, which is determined in accordance with the preliminary read-out image information. Specifically, at the time at which the preliminary read-out image information has been obtained, the information, such as the image density distribution, of the image having been recorded on the image storage sheet can be ascertained approximately. Therefore, a certain level of correction amount, or the like, for the final read-out image information can be determined in accordance with the preliminary read-out image information.

Therefore, the color and density correcting means sets the correction amount, or the like, such that it may vary in accordance with the parameter, which is determined in accordance with the preliminary read-out image information.

In this specification, an apparatus, which is formed by combining the functions of the image read-out apparatus and the functions of the image processing apparatus with each other, is referred to as the image read-out and processing apparatus.

However, the correction amount, which is set by the color and density correcting means in accordance with the parameter having been determined in accordance with the preliminary read-out image information, is not always appropriate for the correction of color and density of the final read-out image information. For example, in cases where the image having been recorded on the image storage sheet has the characteristics such that its image density distribution may be markedly biased to the high image density side, there is the risk that the accuracy, with which the image is detected, cannot be kept high.

Specifically, it is necessary for the photoelectric conversion means to be capable of detecting the preliminary read-out image information over a wide range, and therefore the photoelectric conversion means has a wide dynamic range. However, such that saturation may be prevented from being reached on the low image density side (on which the amount of light having passed through the image storage sheet is large) of the dynamic range, the dynamic range of the photoelectric conversion means is set by taking the low image density side as reference. As a result, errors readily occur in detecting the information on the high image density side.

Also, errors often occur in adjusting the amount of light irradiated to the image storage sheet. Therefore, it often occurs that, with the correction made in accordance with the preliminary read-out image information alone, the final read-out image information cannot be corrected perfectly.

Accordingly, if the parameter is set by utilizing the preliminary read-out image information containing errors, there will be the risk that the degree of correction of color and density depending upon the parameter becomes different from a desired degree of correction, and an image having desired color and density cannot be reproduced.

SUMMARY OF THE INVENTION

The primary object of the present invention is to provide an image read-out and processing apparatus, wherein the accuracy, with which a color and density correcting means carries out correction of color and density on final read-out image information in accordance with a parameter having been determined in accordance with preliminary read-out image information, is kept high.

Another object of the present invention is to provide an image read-out and processing apparatus, wherein the cycle time of the entire processing, which ranges from the start of a preliminary readout to correction of color and density, is kept short.

An image read-out and processing apparatus in accordance with the present invention is characterized by correcting a parameter, which has been determined in accordance with preliminary read-out image information, in accordance with final read-out image information. Image processing (correction of color and density) is thereby achieved more accurately than with an apparatus which utilizes a parameter depending upon the preliminary read-out image information alone.

Specifically, the present invention provides an image read-out and processing apparatus comprising:

i) an image read-out section for:
carrying out a preliminary read-out operation by irradiating light, which has been produced by a light source, to an image storage sheet, on which an image has been recorded, and by detecting the light carrying image information representing the image, which light has passed through the image storage sheet or has been reflected by the image storage sheet, with a photoelectric conversion means (such as a CCD image sensor), the image information being detected under read-out conditions, in which the amount of light irradiated to the image storage sheet and/or the light accumulation time of the photoelectric conversion means is set to be equal to a predetermined value, and carrying out a final read-out operation by irradiating light, which has been produced by a light source, to the image storage sheet and by detecting the light carrying the image information representing the image, which light has passed through the image storage sheet or has been reflected by the image storage sheet, with a photoelectric conversion means, final read-out image information being thereby obtained, the amount of light irradiated to the image storage sheet and/or the light accumulation time of the photoelectric conversion means being adjusted appropriately in the final read-out operation in accordance with preliminary read-out image information, which has been obtained from the preliminary read-out operation, and ii) an image processing section provided with a color and density correcting means for correcting the final read-out image information such that the color and the density of the image may become appropriate, and for determining the degree of correction, which is carried out on the final read-out image information, in accordance with a parameter, which is set in accordance with the preliminary read-out image information, wherein the image read-out and processing apparatus further comprises a parameter correcting means for correcting the parameter in accordance with the final read-out image information.

The adjustment of the amount of light irradiated to the image storage sheet may be carried out by adjusting the voltage and the current applied to the light source and thereby directly adjusting the amount of light produced by the light source. Alternatively, the adjustment of the amount of light irradiated to the image storage sheet may be carried out by locating a stop, such as an exponential curve filter, between the light source and the image storage sheet.

The adjustment of the amount of light irradiated to the image storage sheet and/or the light accumulation time of the photoelectric conversion means should preferably be carried out in accordance with a value corresponding to the minimum image density of the image, which value is represented by the preliminary read-out image information. In such cases, saturation of the photoelectric conversion means, such as the CCD image sensor, can be prevented from occurring on the low image density side.

The image read-out section should preferably be constituted such that, in cases where the value corresponding to the minimum image density of the image is larger than a predetermined threshold value, i.e. in cases where the image has an image density distribution biased to a high image density side, the image read-out section may appropriately adjust the amount of light irradiated to the image storage sheet and/or the light accumulation time of the photoelectric conversion means in accordance with the signal (information) value corresponding to the minimum image density and may thereby again carry out a preliminary read-out operation. In cases where the image has the image density distribution biased to a high image density side, there is a high level of probability that large errors will occur in the preliminary read-out image information. Therefore, in such cases, the amount of light irradiated to the image storage sheet is reduced, and/or the light accumulation time of the photoelectric conversion means is shortened. In this manner, the image density distribution detected by the photoelectric conversion means can be shifted to the low image density side as a whole, and the low image density side in the dynamic range of the photoelectric conversion means can be utilized efficiently.

Also, the adjustment of the amount of light irradiated to the image storage sheet should preferably be carried out with a stop, such as an exponential curve filter, and the correction of color and density should preferably be carried out by adding the final read-out image information and a correction value, which is set in accordance with the parameter, to each other or by subtracting the final read-out image information and the correction value from each other, and thereby shifting the correction value. In cases where an exponential curve filter, an exponential curve stop, or the like, in which the stop amount changes exponentially, is used, the image density can be shifted linearly and, as a result, the correction value can be shifted.

The correction of color and density may be carried out in accordance with the difference between the final read-out image information and the preliminary read-out image information. Specifically, the correction of color and density may be carried out in accordance with the difference between the mean value of the final read-out image information and the mean value of the preliminary read-out image information, the difference between the median value of the final read-out image information and the median value of the preliminary read-out image information, the difference between a value corresponding to the minimum image density in the final read-out image information and a value corresponding to the minimum image density in the preliminary read-out image information, or the like.

In the image read-out and processing apparatus in accordance with the present invention, a single light source may serve as both the light source for the preliminary read-out operation and the light source for the final read-out operation, and a single photoelectric conversion means may serve as both the photoelectric conversion means for the preliminary read-out operation and the photoelectric conversion means for the final read-out operation.

With the image read-out and processing apparatus in accordance with the present invention, the final read-out image information is predicted in accordance with the preliminary read-out image information. The parameter, which has been set temporarily in accordance with the predicted final read-out image information, is corrected with respect to the actually obtained final read-out image information, and the process for correcting the color and the density is carried out by utilizing the thus corrected parameter. Therefore, an image having color closer to desired color and density closer to desired density can be obtained than with the conventional technique, in which the process for correcting the color and the density is carried out by merely utilizing the temporarily set parameter.

Also, instead of the parameter being determined in accordance with the final read-out image information from the initial stage, the parameter is temporarily determined in accordance with the preliminary read-out image information. Therefore, the calculation of the parameter can be carried out simultaneously while the final readout is being carried out. After the final readout is finished and the final read-out image information has been obtained, the representative values serving as the reference, such as the mean values or the minimum image density values, of the preliminary read-out image information and the final read-out image information may be compared with each other. In accordance with the difference obtained as a result of the comparison, or the like, a simple calculation process, such as shifting of the temporarily determined parameter (e.g., the addition or subtraction of a value corresponding to the difference), may be carried out. Accordingly, the time, which is required to carry out the calculation process after the final readout has been finished, can be kept short. The cycle time of the entire processing, which ranges from the start of the preliminary readout to the correction of color and density, can thus be kept short.

DESCRIPTION OF THE PREFERRED EMBODIMENTS

The present invention will hereinbelow be described in further detail with reference to the accompanying drawings.

Figure 1:
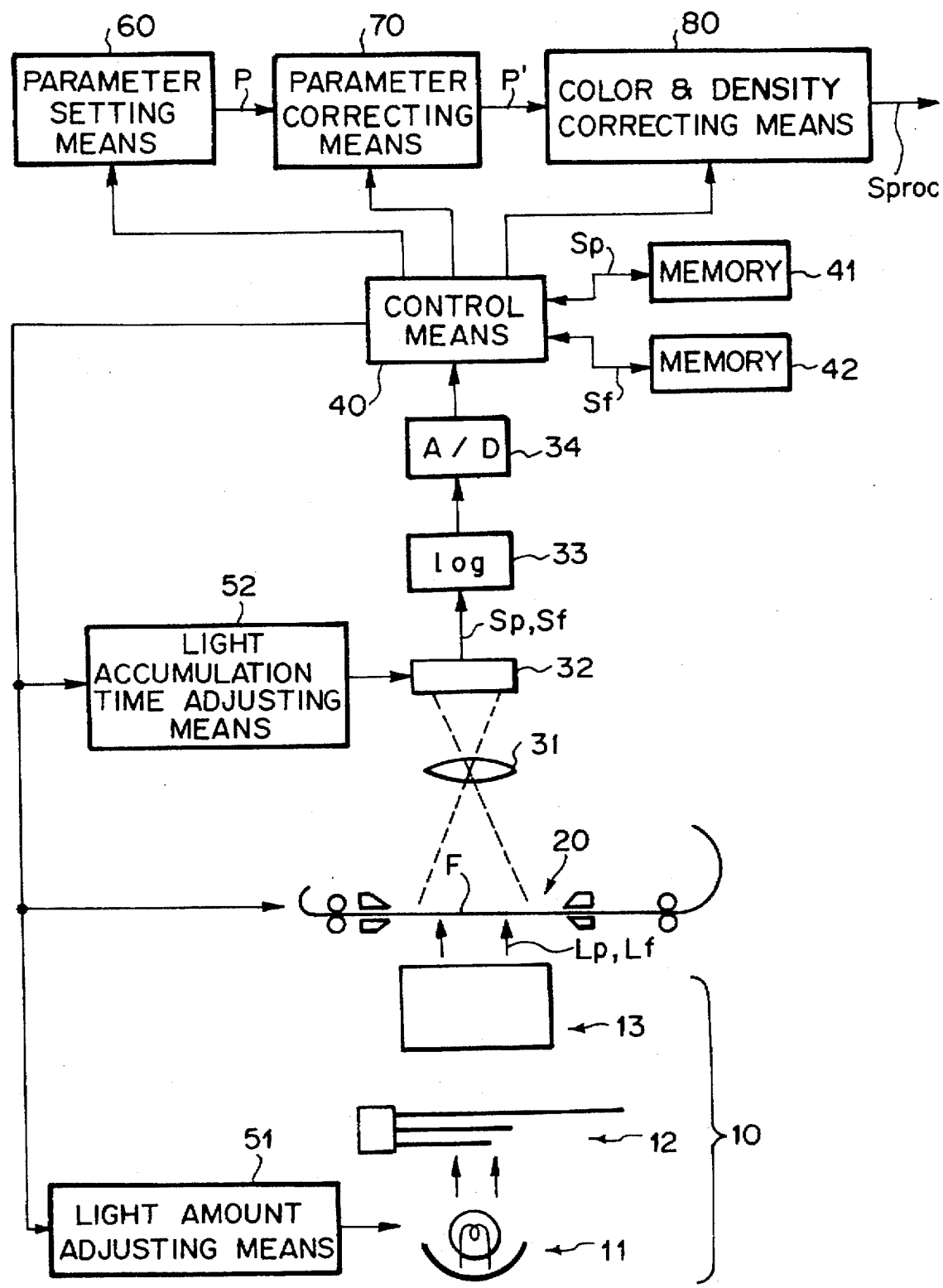
FIG. 1 is a block diagram showing an embodiment of the image read-out and processing apparatus in accordance with the present invention.

FIG. 1 is a block diagram showing an embodiment of the image read-out and processing apparatus in accordance with the present invention. In the image read-out and processing apparatus shown in FIG. 1, light is irradiated to negative film F, on which an image has been recorded, and the light, which has passed through the film F and carries the image information of the image, is photoelectrically detected. In this manner, a digital image signal representing the image is obtained. A process for correcting color and density is carried out on the image signal, and a processed image signal having thus been obtained is fed into a storage medium, a printing apparatus, or the like. Before a final readout (a fine scanning operation) is carried out in order to obtain the image information (the final read-out image information) which is to be used in reproduction of a visible image, a preliminary readout (a pre-scanning operation) is carried out under predetermined read-out conditions in order to obtain the approximate image information (the preliminary read-out image information). Read-out conditions for the final readout are set in accordance with the preliminary read-out image information.

Specifically, the image read-out and processing apparatus comprises a light source unit 10, which is provided with a variable light amount type of light source 11, a color separation and light regulating unit 12, and a diffusion box 13. In the light source unit 10, light having been produced by the light source 11 passes through the color separation and light regulating unit 12 and the diffusion box 13 and then impinges upon the film F, which is set on a film carrier 20. The image read-out and processing apparatus also comprises an image forming lens 31 for projecting the light, which has passed through the film F and carries the image information representing the image having been recorded on the film F, onto a predetermined plane, and a variable light accumulation time type of CCD image sensor 32, which is located on the projection plane and photoelectrically detects the light, which has passed through the film F. The image read-out and processing apparatus further comprises a logarithmic converter 33 for logarithmically amplifying an image signal, which has been obtained from the CCD image sensor 32, and an analog-to-digital converter 34 for converting the logarithmically amplified image signal into a digital image signal. The image read-out and processing apparatus still further comprises a first memory 41 for storing the preliminary read-out image information (hereinbelow often referred to as the preliminary read-out image signal) Sp, which has been obtained from the preliminary readout and is one of the digital image signals obtained from the analog-to-digital converter 34, and a second memory 42 for storing the final read-out image information (hereinbelow often referred to as the final read-out image signal) Sf, which has been obtained from the final readout. The image read-out and processing apparatus also comprises a light amount adjusting means 51 for adjusting the amount of light produced by the light source 11, which light amount serves as one of the read-out conditions for the final readout, in accordance with the preliminary read-out image signal Sp, and a light accumulation time adjusting means 52 for adjusting the light accumulation time of the CCD image sensor 32, which light accumulation time serves as one of the read-out conditions for the final readout. The image read-out and processing apparatus further comprises a control means 40, which controls the inputs into and outputs from the first memory 41 and the second memory 42, and which determines the read-out conditions for the final readout in accordance with the preliminary read-out image signal Sp and controls the light amount adjusting means 51, the light accumulation time adjusting means 52, the film carrier 20, and the like. The image read-out and processing apparatus still further comprises a color and density correcting means 80 for carrying out a process for correcting color and density on a final read-out image signal Sf, which has been obtained from the final readout, and in accordance with a received parameter. A processed image signal Sproc is obtained from the color and density correcting means 80. The image read-out and processing apparatus also comprises a parameter setting means 60 for setting a temporary parameter P in accordance with the preliminary read-out image information, and a parameter correcting means 70 for correcting the temporary parameter P, which has been set by the parameter setting means 60, in accordance with the final read-out image signal Sf and thereby obtaining a corrected parameter P'. The corrected parameter P' is fed into the color and density correcting means 80.

How this embodiment operates will be described hereinbelow.

The control means 40 controls such that the film carrier 20 may move the film F a distance equal to the length of a single frame and such that the light source 11 may produce an amount of light Lp, which amount has been set for the pre-scanning operation by the light amount adjusting means 51. The light Lp passes through the color separation and light regulating unit 12 and the diffusion box 13 and is then irradiated to the film F, which is set on the film carrier 20. The light Lp, which has passed through the film F and carries the image information (image density) representing the image having been recorded on the film F, passes through the image forming lens 31 and then impinges upon the CCD image sensor 32.

The CCD image sensor 32 photoelectrically converts the light Lp under the conditions of the light accumulation time, which has been set by the light accumulation time adjusting means 52. The preliminary read-out image signal Sp is thereby obtained from the CCD image sensor 32.

The preliminary read-out image signal Sp is then logarithmically amplified by the logarithmic converter 33 and converted by the analog-to-digital converter 34 into a digital image signal Sp. The digital preliminary read-out image signal Sp is then fed into the control means 40.

The control means 40 feeds the received preliminary read-out image signal Sp into the first memory 41. The preliminary read-out image signal Sp is stored in the first memory 41. Also, the control means 40 analyzes the image density width, or the like, of the preliminary read-out image signal Sp and sets the read-out conditions appropriate for the final readout, i.e. the amount of light irradiated to the film F and the light accumulation time of the CCD image sensor 32, in accordance with the results of the analysis of the preliminary read-out image signal Sp. The information representing the thus set amount of light irradiated to the film F is fed into the light amount adjusting means 51. The information representing the thus set light accumulation time of the CCD image sensor 32 is fed into the light accumulation time adjusting means 52.

The amount of light irradiated to the film F and the light accumulation time of the CCD image sensor 32 may be set in accordance with, for example, the value (the minimum image density value) Sp1 corresponding to the minimum image density represented by the preliminary read-out image signal Sp.

Further, the control means 40 feeds the preliminary read-out image signal Sp into the parameter setting means 60.

The parameter setting means 60 sets the temporary parameter P for determining the degree of correction in the process for correcting the color and the density, which is carried out by the color and density correcting means 80 on the image signal. The term "degree of correction of color and density" as used herein means the degree of correction of the density density, the color balance, and the like.

The fine scanning operation is carried out in the manner described below. The light amount adjusting means 51 adjusts the amount of light produced by the light source 11 such that it may coincide with the light amount having been set by the control means 40. Also, the light accumulation time adjusting means 52 adjusts the light accumulation time of the CCD image sensor 32 such that it may coincide with the light accumulation time having been set by the control means 40.

The light source 11 produces the amount of light Lf having been set by the light amount adjusting means 51. As in the pre-scanning operation, the light Lf passes through the color separation and light regulating unit 12 and the diffusion box 13 and is then irradiated to the film F. The light Lf, which has passed through the film F, passes through the image forming lens 31 and then impinges upon the CCD image sensor 32.

The CCD image sensor 32 photoelectrically converts the light Lf under the conditions of the light accumulation time, which has been set by the light accumulation time adjusting means 52. The final read-out image signal Sf is thereby obtained from the CCD image sensor 32.

The final read-out image signal Sf having thus been obtained is fed into the control means 40 via the logarithmic converter 33 and the analog-to-digital converter 34.

The control means 40 feeds the received final read-out image signal Sf into the second memory 42. The final read-out image signal Sf is stored in the second memory 42.

Thereafter, the control means 40 reads the preliminary read-out image signal Sp from the first memory 41 and calculates the minimum image density value Sp1 represented by the preliminary read-out image signal Sp. Also, the control means 40 reads the final read-out image signal Sf from the second memory 42 and calculates the minimum image density value Sf1 represented by the final read-out image signal Sf. The difference (Sp1−Sf1) between the two minimum image density values Sp1 and Sf1 is then calculated, and the information representing the difference (Sp1−Sf1) is fed into the parameter correcting means 70.

The parameter correcting means 70 corrects the temporary parameter P, which has been set by the parameter setting means 60 in accordance with the preliminary read-out image signal Sp, in accordance with the difference (Sp1−Sf1) between the minimum image density value Sp1 represented by the preliminary read-out image signal Sp and the minimum image density value Sf1 represented by the final read-out image signal Sf. The corrected parameter P' is thereby set by the parameter correcting means 70.

For example, in cases where the amount of light, which is irradiated to the film F in the final readout, is set to be two times as large as the amount of light, which is irradiated to the film F in the preliminary readout, and an error in adjusting the amount of light irradiated to the film F is represented by $\alpha$, the formula shown below obtains.

$$Sp1-Sf1=0.3+\alpha$$

Therefore, in such cases, the temporary parameter P may be corrected by an amount equal to $(0.3+\alpha)$.

The information representing the corrected parameter P' is fed into the color and density correcting means 80. The color and density correcting means 80 carries out the process for correcting the color and the density by a correction amount corresponding to the received corrected parameter P'. In this manner, the processed image signal Sproc can be obtained from the process for correcting the color and the density into the desired color and density.

More specifically, in cases where the correction of color and density is carried out with respect to the image density values, if the correcting process carried out by the color and density correcting means 80 in accordance with the parameter P is represented by the formula shown below, $$Sproc=func(Sf)$$

the process in accordance with the corrected parameter P' can be set with the formula shown below.

$$Sproc=func(Sf+(Sp1-Sf1))$$

As described above, with the image read-out and processing apparatus in accordance with the present invention, the final read-out image signal Sf is predicted in accordance with the preliminary read-out image signal Sp. The parameter P, which has been set temporarily in accordance with the predicted final read-out image signal Sf, is corrected with respect to the actually obtained final read-out image signal Sf, and the process for correcting the color and the density is carried out by utilizing the thus corrected parameter P'. Therefore, an image having color closer to desired color and density closer to desired density can be obtained than with the conventional technique, in which the process for correcting the color and the density is carried out by merely utilizing the temporarily set parameter P.

Figure 2:
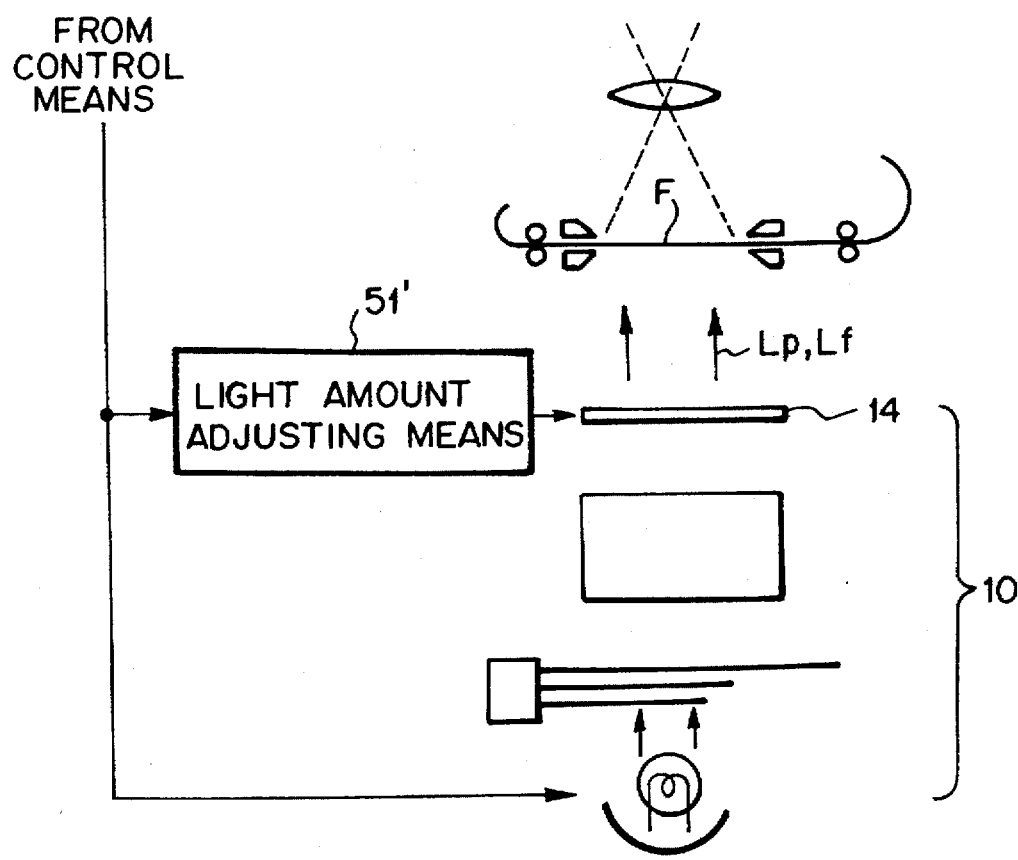
FIG. 2 is a partial block diagram showing a different embodiment of the image read-out and processing apparatus in accordance with the present invention, in which a different light amount adjusting means is employed.

In this embodiment, as the light amount adjusting means, the light amount adjusting means 51 for directly adjusting the amount of light produced by the light source 11 is employed. Alternatively, as illustrated in FIG. 2, a filter 14, which has the characteristics such that the amount of light passing through it may be variable, may be located between the light source 11 and the film F, and a light amount adjusting means 51' for adjusting the amount of light passing through the filter 14 may be employed.

In such cases, as the filter 14, a exponential curve filter should preferably be employed. In cases where the exponential curve filter is thus used, the parameter correcting means 70 can correct the temporary parameter P only with a simple calculation process, in which the preliminary read-out image signal Sp is shifted.

Also, in the embodiment described above, the temporary parameter P is corrected in accordance with the difference (Sp1−Sf1) between the minimum image density value Sp1 represented by the preliminary read-out image signal Sp and the minimum image density value Sf1 represented by the final read-out image signal Sf. Alternatively, the temporary parameter P may be corrected in accordance with the difference (Spm−Sfm) between the mean value Spm of the preliminary read-out image signal Sp and the mean value Sfm of the final read-out image signal Sf.

Further, in cases where the minimum image density value Sp1, which is represented by the preliminary read-out image signal Sp having been obtained from the pre-scanning operation, is larger than a threshold value $S_0$, which has been set previously in accordance with the results of experiments, or the like, a pre-scanning operation may be carried out again under different read-out conditions.

In cases where the pre-scanning operation is carried out again, the problems can be prevented from occurring in that, when the image has the characteristics such that the image density is biased to the high image density side, the read-out conditions for the fine scanning operation cannot be set accurately in accordance with the information, which has been obtained from the first pre-scanning operation. Therefore, the read-out conditions for the final readout (i.e. the read-out conditions for the fine scanning operation) can be set accurately.

What is claimed is:

1. An image read-out and processing apparatus comprising:

i) an image read-out section for:

carrying out a preliminary read-out operation by irradiating light, which has been produced by a light source, to an image storage sheet, on which an image has been recorded, and by detecting the light carrying image information representing the image, which light has passed through the image storage sheet or has been reflected by the image storage sheet, with a photoelectric conversion means, the image information being detected under read-out conditions, in which the amount of light irradiated to the image storage sheet and/or the light accumulation time of the photoelectric conversion means is set to be equal to a predetermined value, and carrying out a final read-out operation by irradiating light, which has been produced by a light source, to the image storage sheet and by detecting the light carrying the image information representing the image, which light has passed through the image storage sheet or has been reflected by the image storage sheet, with a photoelectric conversion means, final read-out image information being thereby obtained, the amount of light irradiated to the image storage sheet and/or the light accumulation time of the photoelectric conversion means being adjusted appropriately in the final read-out operation in accordance with preliminary read-out image information, which has been obtained from the preliminary read-out operation, and ii) an image processing section provided with a color and density correcting means for correcting the final read-out image information such that the color and the density of the image may become appropriate, and for determining the degree of correction, which is carried out on the final read-out image information, in accordance with a parameter, which is set in accordance with the preliminary read-out image information, wherein the image read-out and processing apparatus further comprises a parameter correcting means for correcting the parameter in accordance with the final read-out image information.

2. An apparatus as defined in claim 1 wherein the adjustment of the amount of light irradiated to the image storage sheet and/or the light accumulation time of the photoelectric conversion means is carried out in accordance with a value corresponding to the minimum image density of the image, which value is represented by the preliminary read-out image information.

3. An apparatus as defined in claim 2 wherein the image read-out section is constituted such that, in cases where said value corresponding to said minimum image density of the image, which value is represented by the preliminary read-out image information, is larger than a predetermined threshold value, the image read-out section may appropriately adjust the amount of light irradiated to the image storage sheet and/or the light accumulation time of the photoelectric conversion means in accordance with said value corresponding to said minimum image density and may thereby again carry out a preliminary read-out operation.

4. An apparatus as defined in claim 3 wherein the adjustment of the amount of light irradiated to the image storage sheet is carried out with an expotential curve stop, and the correction of color and density is carried out by adding the final read-out image information and a correction value, which is set in accordance with the parameter, to each other or by subtracting the final read-out image information and said correction value from each other.

5. An apparatus as defined in claim 3 wherein the correction of color and density is carried out in accordance with the difference between the final read-out image information and the preliminary read-out image information.

6. An apparatus as defined in claim 5 wherein said difference between the final read-out image information and the preliminary read-out image information is the difference between a value corresponding to the minimum image density of the image, which value is represented by the final read-out image information, and said value corresponding to the minimum image density of the image, which value is represented by the preliminary read-out image information.

7. An apparatus as defined in claim 5 wherein said difference between the final read-out image information and the preliminary read-out image information is the difference between the mean value of the final read-out image information and the mean value of the preliminary read-out image information.

8. An apparatus as defined in claim 5 wherein said difference between the final read-out image information and the preliminary read-out image information is the difference between the median value of the final read-out image information and the median value of the preliminary read-out image information.

9. An apparatus as defined in claim 2 wherein the adjustment of the amount of light irradiated to the image storage sheet is carried out with an exponential curve stop, and the correction of color and density is carried out by adding the final read-out image information and a correction value, which is set in accordance with the parameter, to each other or by subtracting the final read-out image information and said correction value from each other.

10. An apparatus as defined in claim 2 wherein the correction of color and density is carried out in accordance with the difference between the final read-out image information and the preliminary read-out image information.

11. An apparatus as defined in claim 10 wherein said difference between the final read-out image information and the preliminary read-out image information is the difference between a value corresponding to the minimum image density of the image, which value is represented by the final read-out image information, and said value corresponding to the minimum image density of the image, which value is represented by the preliminary read-out image information.

12. An apparatus as defined in claim 10 wherein said difference between the final read-out image information and the preliminary read-out image information is the difference between the mean value of the final read-out image information and the mean value of the preliminary read-out image information.

13. An apparatus as defined in claim 10 wherein said difference between the final read-out image information and the preliminary read-out image information is the difference between the median value of the final read-out image information and the median value of the preliminary read-out image information.

14. An apparatus as defined in claim 1 wherein the image read-out section is constituted such that, in cases where a value corresponding to the minimum image density of the image, which value is represented by the preliminary read-out image information, is larger than a predetermined threshold value, the image read-out section may appropriately adjust the amount of light irradiated to the image storage sheet and/or the light accumulation time of the photoelectric conversion means in accordance with said value corresponding to said minimum image density and may thereby again carry out a preliminary read-out operation.

15. An apparatus as defined in claim 14 wherein the adjustment of the amount of light irradiated to the image storage sheet is carried out with an exponential curve stop, and the correction of color and density is carried out by adding the final read-out image information and a correction value, which is set in accordance with the parameter, to each other or by subtracting the final read-out image information and said correction value from each other.

16. An apparatus as defined in claim 14 wherein the correction of color and density is carried out in accordance with the difference between the final read-out image information and the preliminary read-out image information.

17. An apparatus as defined in claim 16 wherein said difference between the final read-out image information and the preliminary read-out image information is the difference between a value corresponding to the minimum image density of the image, which value is represented by the final read-out image information, and said value corresponding to the minimum image density of the image, which value is represented by the preliminary read-out image information.

18. An apparatus as defined in claim 16 wherein said difference between the final read-out image information and the preliminary read-out image information is the difference between the mean value of the final read-out image information and the mean value of the preliminary read-out image information.

19. An apparatus as defined in claim 16 wherein said difference between the final read-out image information and the preliminary read-out image information is the difference between the median value of the final read-out image information and the median value of the preliminary read-out image information.

20. An apparatus as defined in claim 1 wherein the adjustment of the amount of light irradiated to the image storage sheet is carried out with an exponential curve stop, and the correction of color and density is carried out by adding the final read-out image information and a correction value, which is set in accordance with the parameter, to each other or by subtracting the final read-out image information and said correction value from each other.

21. An apparatus as defined in claim 1 wherein the correction of color and density is carried out in accordance with the difference between the final read-out image information and the preliminary read-out image information.

22. An apparatus as defined in claim 21 wherein said difference between the final read-out image information and the preliminary read-out image information is the difference between a value corresponding to the minimum image density of the image, which value is represented by the final read-out image information, and a value corresponding to the minimum image density of the image, which value is represented by the preliminary read-out image information.

23. An apparatus as defined in claim 9 wherein said difference between the final read-out image information and the preliminary read-out image information is the difference between the mean value of the final read-out image information and the mean value of the preliminary read-out image information.

24. An apparatus as defined in claim 21 wherein said difference between the final read-out image information and the preliminary read-out image information is the difference between the median value of the final read-out image information and the median value of the preliminary read-out image information.

25. An apparatus as defined in claim 1 wherein a single light source serves as both the light source for the preliminary read-out operation and the light source for the final read-out operation, and a single photoelectric conversion means serves as both the photoelectric conversion means for the preliminary read-out operation and the photoelectric conversion means for the final read-out operation.

* * * * *